United States Patent [19]
Cotten

[11] 3,994,515
[45] Nov. 30, 1976

[54] JOINDER OF PLASTIC PIPE

[76] Inventor: Roger C. Cotten, 299 Vincent St., Metairie, La. 70002

[22] Filed: Nov. 21, 1975

[21] Appl. No.: 634,144

[52] U.S. Cl. .................. 285/21; 156/294; 156/304; 156/306; 156/499; 156/503; 285/150; 285/156; 285/423; 285/331
[51] Int. Cl.² ........................................ F16L 13/02
[58] Field of Search ............ 285/21, 22, 284, 423, 285/150, 156, 331; 156/294, 304, 306, 499, 158, 503

[56] References Cited
UNITED STATES PATENTS

| | | | |
|---|---|---|---|
| 2,739,829 | 3/1956 | Pedlow et al. | 285/21 |
| 2,741,402 | 4/1956 | Sayre | 285/21 X |
| 2,958,906 | 11/1960 | Youthed | 156/294 |
| 3,378,672 | 4/1968 | Blumenkranz | 285/21 X |
| 3,506,519 | 4/1970 | Blumenkranz | 156/306 X |
| 3,788,928 | 1/1974 | Wise | 285/21 |

FOREIGN PATENTS OR APPLICATIONS

| | | | |
|---|---|---|---|
| 821,863 | 10/1959 | United Kingdom | 156/306 |

Primary Examiner—Dave W. Arola
Attorney, Agent, or Firm—James C. Fails

[57] ABSTRACT

Plastic elements, such as conduit, and method and apparatus for joinder of same characterized by respective regions, or surfaces, of hot-to-cold plastic adjacent regions of hot-to-hot plastic for forming a substantially immediate physical fixation of the hot-to-cold regions and followed by a more nearly perfect sealing fusion of the hot-to-hot regions to form a strong sealing joint. In a specific embodiment, a tubular end is joined to a fitting in which the fitting has one or more annular recesses about its bore for allowing expanded, excess molten plastic to flow thereinto and become solidified for a strong sealed joint. This also eliminates forming streamers that frequently caused leaks in the joints heretofore. Also disclosed are the details of the apparatus for heating the respective regions, or surfaces, of the plastic elements.

25 Claims, 10 Drawing Figures

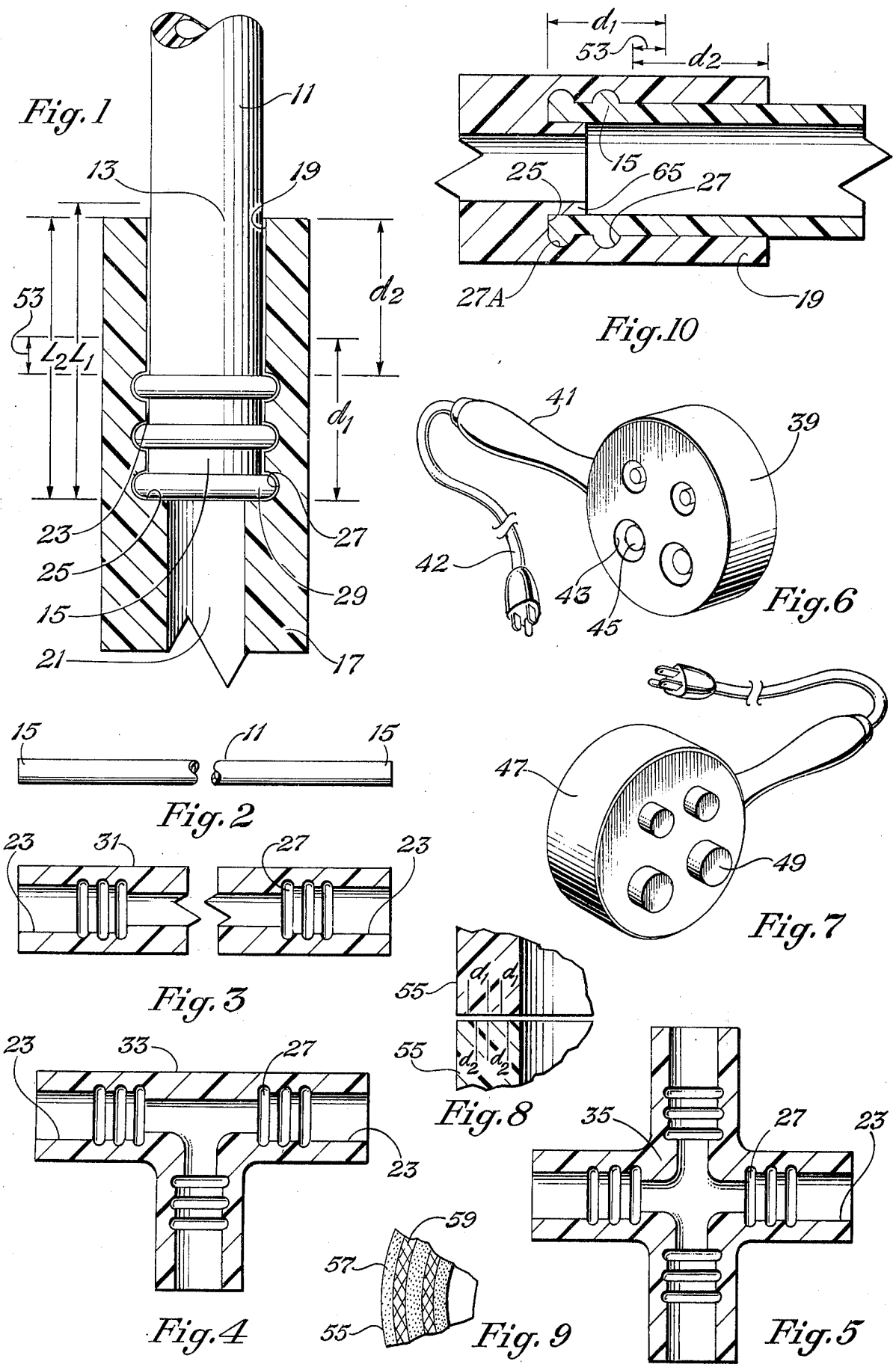

JOINDER OF PLASTIC PIPE

BACKGROUND OF THE INVENTION

1. Field of the Invention:

This invention relates to joinder of plastic elements, such as plastic conduit. More particularly, this invention relates to the elements of plastic conduit, such as conduit sections and fittings; and to the apparatus and method for joining the elements into a desired distribution network, as for liquids like water; gases like steam and semi-solids like slurries.

2. Description of the Prior Art:

The prior art has seen a wide variety of thermoplastic elements and their joinder. The joinder of the thermoplastic elements has involved, heretofore, the use of solvents or the melting of one or both of the pieces of plastic and the immobilization of the pieces of plastic in the desired relationship to each other for fusion of the elements. Where plastic conduit was desired to be joined in fluid tight relationship, this has taken the form of heating of tubular ends and socket ends, joinder thereof, and immobilization in a jig or the like for 20–90 seconds while awaiting for the fusion to take place. There was a tendency to cause a notching, or necking down, and stress cracking, of the conduit walls near the fitting. If, in the interim, there was relative movement between the contiguous surfaces, a leak was effected, resulting in a relatively high percentage of imperfect seals. Moreover, metal stiffeners in small diameter pipe, have to be longer than the fitting socket to support the weakened and thinned conduit, which often cause destruction in that the stiffeners themselves cause notching of conduit thereby creating stress and leaks. Typically, commercial installations have required as much as six to ten percent of the joints formed to be cut out of a given job. This is a very expensive and time consuming process. Also the time of holding the elements in a jig or the like has slowed down production and caused appreciable expense.

My experience in this art over several years has indicated that a method of joining thermoplastic elements, such as pipe and fittings, should have the following desirable features not heretofore provided:

1. The conduit, fittings, apparatus and method should not require an internal stiffener that has frequently cut the conduit heretofore.

2. The conduit walls should not be thinned, as was done by notching, or drawing, of the conduit walls in the prior art. Consequently, the prior art pipe has had a low strength whereas it is desirable that the conduit have a greater strength adjacent the fitting than heretofore provided.

3. It is desirable that there be a substantially immediate physical fixation to eliminate the requirement for immobilization for a protracted interval of time as has been required in the prior art; yet, the method of joinder should provide a sealing fusion of hot-to-hot plastic.

4. The method should eliminate the streaming of the molten plastic back alongside tubular ends of conduit inserted within the fittings with the attendant leaks, as has frequently occurred in the prior art.

5. It is desirable that the method provide a strong joint, that cannot be pulled apart by providing at least an annular lip that engages an annular recess, or groove.

6. It is desirable that the method not only eliminate the need for protracted holding, but eliminate the relatively high percentage of inferior joints of the prior art because of relative movement between the fusing parts during the fusion process.

SUMMARY OF THE INVENTION

It is an object of this invention to provide one or more of the foregoing features not heretofore provided by the prior art, thereby alleviating the difficulties of the prior art.

It is another object of this invention to provide a plurality of the features delineated hereinbefore.

In specific aspects, it is an object of this invention to provide all of the features delineated hereinbefore and not heretofore provided.

In accordance with this invention, there is provided the thermoplastic elements, such as conduit and fitting; and apparatus for; and method of joining together the thermoplastic elements. The thermoplastic elements and the apparatus are adapted for carrying out the method; which involves a plurality of steps. First, first and second surfaces are formed on the respective first and second elements. The first and second surfaces are adapted to matingly engage when the elements are brought together for joinder.

Second, at least first and second portions of the first and second surfaces are heated to their softening points. The first and second portions are chosen and disposed such that their respective lateral distances $d_1$ and $d_2$ overlap to form at least one region of each of hot-to-cold plastic and hot-to-hot plastic. The hot-to-cold plastic effects imperfect sealing but has a "grabbing action" that achieves substantially immediate physical fixation for eliminating relative movement between the first and second elements; thereby eliminating the usual requirement of holding in a jig or the like for a protracted interval for the sealing fusion to take place. The hot-to-hot plastic effects a sealing fusion of the contiguous sections of hot-to-hot plastic.

In specific embodiments, the conduit is joined by insertion of a tubular end of a conduit section within a socket end of a fitting in which the fitting has at least one annular recess into which the expanding molten plastic can flow. Preferably, a plurality of annular recesses are employed. As a result, annularly disposed lips are formed that increase the physical strength of the joint while eliminating the streaming back over the tubular end that has been the cause of leaks in the prior art.

In another embodiment, mating ends of conduit, or other tubular elements, are joined together with concentric annular rings that form overlapping sections of hot-to-cold and hot-to-hot plastic for the requisite physical fixation followed by sealing fusion.

The foregoing objects, as well as other objects and the invention, will be more thoroughly understood by referring to the descriptive matter hereinafter, particularly when taken in conjunction with the appended drawings.

BRIEF DESCRIPTION OF THE DRAWINGS

FIG. 1 is a partial cross sectional view of a tubular end of a conduit inserted within a tubular end of a fitting in accordance with an embodiment of this invention.

FIG. 2 is a side elevational view of a section of a conduit for being joined in accordance with FIG. 1.

FIG. 3 is a cross sectional view of a coupling for effecting joinder of sections of conduit of FIG. 2, similarly as illustrated in FIG. 1.

FIG. 4 is a cross sectional view of a tee for joinder of sections of conduit into a desired network.

FIG. 5 is a cross sectional view of a cross for effecting joinder of a plurality of sections of conduit.

FIG. 6 is an isometric view of a means for heating the tubular ends of the sections of conduit for effecting joinder with the fitting.

FIG. 7 is an isometric view of a heating means for heating the socket ends of the fittings for effecting joinder with the conduit.

FIG. 8 is a partial side elevational cross sectional view of tubular walls of plastic conduit being joined in abutting relationship in accordance with another embodiment of this invention.

FIG. 9 is a partial cross sectional view of the embodiment of FIG. 8 illustrating the respective portions of hot-to-cold and hot-to-hot plastic for effecting a sealing butt joint.

FIG. 10 is a partial cross sectional view of a particularly preferred embodiment of this invention.

DESCRIPTION OF PREFERRED EMBODIMENTS

The descriptive matter hereinafter will be directed toward the joining of substantially cylindrical tubular, thermoplastic conduit and fitting. The term "conduit" is employed as synonamous with pipe, tubing, hose and the like. It should be borne in mind, however, that the principles employed herein may be employed for the joinder of other thermoplastic elements; and is particularly applicable where a sealing joinder is desired.

Referring to FIG. 1, there is illustrated a section of conduit 11 having a tubular section 13 adjacent and defining its one tube end 15. The conduit is formed of thermoplastic material. Typical of the thermoplastic materials of which the respective elements described hereinafter are formed comprise the polyacrylonitrile butadiene styrene copolymers (ABS), polyethylene, polyvinylchloride, polypropylene and other well known thermoplastic materials. Particularly preferable is the polybutylene type of thermoplastic conduit, such as is available from Southern Chemical Company, Inc., Metairie, Louisiana, 70002.

The tubular section 13 has a first length $L_1$ and has predetermined outside dimensions. As illustrated, the outside dimensions are substantially uniform outside dimensions, such as a cylindrical shape. Ordinarily, the sections of conduit 11 will have carefully prepared outside dimensions, as by being extruded to a uniform dimension, that is acceptable. If desired, however, the tubular section may be formed to exact dimensions by suitable conforming molds, or other suitable methods. The walls are substantially uniform in thickness.

As can be seen in FIG. 2, the section of conduit 11 may be of substantially any length and diameter. It is frequently advantageous to employ ½ or ¾ inch outside diameter (O.D.) plastic conduit in water systems for homes and the like. The polybutylene pipe described hereinbefore has been accepted by the recognized authorities and regulating agencies for conveying the liquids, gases and semi-solids.

Also illustrated in FIG. 1 is a fitting 17 adapted to conformingly receive the tubular section 13 of the conduit 11. The fitting 17 is of the thermoplastic material described hereinbefore and compatible with that of which the conduit 11 is formed. The fitting 17 has a socket end 19 that is concentrically disposed with respect to a first bore 21 penetrating longitudinally through at least a portion of the fitting 17. The socket end 17 has a second length $L_2$ and has a second bore 23 that has inside dimensions closely approximating the outside dimensions of the tube end so that the walls of the fitting and the tubular section will be contiguous when the heated tube end 15 of the conduit 11 is inserted within the second bore 23. Ordinarily, the second bore 23 is larger than the first bore 21 so as to provide a shoulder 25 against which to abut the tube end 15 when they are heated and joined together.

Heretofore, when hot tube ends 15 have been inserted within hot fittings 17, there has been an expansion of the tube ends that has resulted in an excess of molten plastic that forms streamers that are forced intermediate the walls of the tube end and the interior walls of the fitting. These streamers have tended to cause leaks that would ruin a desired sealing fusion between the adjacent contiguous walls of the fitting and the conduit. This was particularly true if there was any relative motion between the parts. Consequently, the parts had to be immobilized for a protracted time interval for the sealing fusion to take place. Moreover, even the slightest relative movement, caused pin holes to develop along these fusion streamers and resulted in an inferior joint. To compensate for this tendency, the fitting 17 has at least one concentric annular recess 27 that extends circumferentially about the second bores 23 for receiving any excess molten plastic that may be created. As illustrated, the fitting 17 has three concentric annular recesses that are closely spaced near each other, the innermost one being adjacent the shoulder 25. The recesses prevent the streamers from forming and enable forming perfect sealing fusion every time, particularly when employed with the additional facets of this invention as described in more detail hereinafter. In addition, the excess molten plastic forms expansion bulbs 29 that provide additional strength and rigidity to the joint. In fact, the joint that is formed is stronger than the walls of either the fitting 17 or the tubular conduit 11; and cannot be pulled apart.

The thermoplastic fittings 17 have been accepted by the regulating agencies and by the authorities as satisfactory for conducting the liquids, gases and semi-solids for residences and the like.

The fittings 17 may comprise any one of a plurality of different types of fittings for use in conjunction with the tubular conduit 11 to form a desired network, as for plumbing for water for a residence or the like. For example, the fitting 17 may take the form of a coupling 31, FIG. 3, and have only two ends for the respective two second bores 23, each with their respective grooves, or annular recesses 27. On the other hand, the fitting may comprise a tee 33 with three ends and three respective second bores 23 and annular recesses 27. Still further, even more complex fittings, such as the cross 35, FIG. 6, may be employed with four or more respective ends, second bores 23 and annular recesses 27.

The respective fittings are formed by any of the processes of the prior art. For example, they may be formed by molding or the like with the respective recesses already therein. On the other hand, the respective second bores and annular grooves may be subsequently formed, in a premanufactured fitting, as by the insertion of hot interior molds of the desired dimension, machining, and the like.

In carrying out one embodiment of this invention, the tube end 15 of conduit 11 is heated for a distance $d_1$ to its softening temperature and the socket end of the fitting 17 is heated for a distance $d_2$ to its softening temperature before the respective tube end and socket end are joined. The respective heating means are illustrated in FIGS. 6 and 7. The illustrated heating means are readily portable so they may be used by a plumber or the like at a remote location, as in a residence being built, without requiring a factory or an elaborate central installation. As illustrated, there is a heating iron 39 having a handle 41 and a means, such as cord 42 for plugging into a source of power, such as electrical power. The heating iron 39 is adapted for heating the tube end 15 for a distance $d_1$ and has suitable receptacles 43, the walls of which are heated above the softening point of the thermoplastic material so as to heat it up to its softening point. For affording interior support, protrusions 45 are located within the receptacles 43, but have a shorter dimension than the walls of the receptacle 43. The protrusions 45 have been omitted in later versions without ill effects. As illustrated in FIG. 7, a heating iron 47 is employed for heating the socket end 19 of the fitting 17. The heating iron 47 may be the other side of the heating iron 39, or may be a mating or a completely different heating iron, as desired. As illustrated, the heating iron 47 has the usual handle and plug in cord, as well as protrusions 49. Any of the heating irons that are conventional in this art may be employed as long as they are satisfactory for heating the tube end and the socket end the respective distances $d_1$ and $d_2$ sufficient to afford at least one region of hot-to-cold plastic and at least one region of hot-to-hot plastic when the tube end is inserted within the socket end 19 in abutting relationship with the shoulder 25.

In the regions in which there is hot-to-cold plastic, there is substantially immediate physical fixation, since the hot plastic tends to "grab onto" the cold and form strong filaments that resist relative movment between the tube end 15 and the socket end 19. The hot-to-cold regions may be formed by either the hot socket and adjacent the relatively colder tube end, as shown by the differential distance $L_1-d_1$ of the tubular end, FIG. 1; or the hot tube end adjacent the relatively colder socket end as shown by the differential distance $L_2-d_2$ of the socket end 19.

In the hot-to-hot region, illustrated by the arrow 53, the hot, contiguous walls of plastic fuse together in sealing relationship to give a final set that is fluid tight and that is stronger than the walls of either the fitting or the conduit.

As noted hereinbefore, when the tube end 15 is inserted within the socket end 19 it expands, or swells; formerly creating streamers and problems with leaking joints. When abutted against the shoulder 25, the hot plastic tends to roll outwardly and back up on itself and toward the cold plastic. With this invention, in the recess 27, there is formed an expansion bulb 29 that locks the joint into place and provides a stronger joint than heretofore. This is particularly true where each fitting and joint has a plurality of recesses 27, since each will form an expansion bulb. The expansion is salutary also in creating larger bores through the conduit 11. Consequently, the fitting can be made with larger bores so there is less pressure drop therethrough at a given flow rate.

It is especially noteworthy that the conduit 11 is not heated outside of the fitting. Consequently, there is no "necking down" or narrowing of the thickness of the side walls of the conduit. Thus, the walls of the conduit remain strong and resist the tendency of the prior art to shear at the edge of the fitting. In addition, because the walls of the tube remain cold exteriorly of the fitting, there is less tendency to stress crack.

In operation, the respective tubing and fitting are formed as indicated hereinbefore. When it is desired to join one end of a fitting to one end of a tubing, the plumber or the like heats the tube end and the socket end. The tube end is inserted interiorly of the appropriate receptacle 43 and over the associated protrusion 45 of the heated heating iron 39 until the desired softening temperature is attained. Similarly, the socket end 19 is inserted over its appropriate protrusion on the heated heating iron 47 until the socket end has reached its softening temperature. Thereafter, the tube end 15 is inserted within the socket end 19. The amount of insertion is easily determined when the end is in abutting relationship with the shoulder 25.

There is substantially immediate physical fixation by the respective hot-to-cold sections of plastic that resists relative movement between the tube end and the socket end. Subsequently, the contiguous hot-to-hot walls fuse to form a sealing interconnection. Because of the physical fixation, however, there is no need to immobilize the respective fitting and tubing, or conduit 11, as in the prior art. The hot end of the tube end 15 forms the expansion bulbs, as illustrated in FIG. 1; which forms a strong joint that resists being pulled apart. Thus, the plumber can go on with forming the other joints substantially immediately without having to have jigs and the like for immobilizing the conduit in the network.

The invention described hereinbefore is a very significant invention. It is surprisingly simple. It has achieved substantially immediate marketing success because of the tremendous improvement over the prior art. The reasons for the improvement have been delineated hereinbefore and will be repeated later hereinafter.

A particularly preferred form of this invention is illustrated in FIG. 10. The same tube end 15, socket end 19, heated for the same distances $d_1$ and $d_2$ so as to obtain the hot-to-cold and hot-to-hot plastic regions are employed. In FIG. 10, however, the fitting has an interiorly disposed annular lip 65 that serves a two-fold purpose. First, it ensures that the proper shape is taken by the hot tube end without an internal metallic stiffener. Second, it defines, in conjunction with the shoulder 25 and recess 27A, a receptacle for receiving the hot tube end 15.

Another embodiment of the invention is illustrated in FIGS. 8 and 9. In FIG. 8, a partial cross section of a wall 55 of a conduit is shown. The walls 55 will have been heated, as by hot air welding guns, in concentric rings of respective dimensions $d_1$ and $d_2$ that are so positioned and so selected as to have an overlap, as illustrated more clearly in FIG. 9. In FIG. 9, the illustrated dotted portions labeled 57 represent hot-to-cold plastic regions in which there is substantially immediate physical fixation. The regions 59, shown criss-crossed, represent hot-to-hot regions where there is sealing fusion to render the joint fluid impervious. This type of a joint is particularly adaptable to relatively thick walled conduit, as in larger sizes of thermoplastic conduit.

Uniformly dimensioned, cylindrically shaped tube ends and socket ends have been illustrated and described hereinbefore, since this structure is most economical and advantageous. If desired, however, other structures, such as frusto-conical mating structures, can be employed.

Thus, it can be seen that this invention accomplishes the objects delineated hereinbefore. Specifically, it provides a method of joining thermoplastic pipe and fittings into a desired network that can be readily accomplished in situ without the requisite of cumbersome jigs for protracted holding times; and has the following features not heretofore provided.

1. It does not require an internal stiffener, within the fitting, that has frequently cut the conduit heretofore.
2. It provides a joint in which the wall of the conduit, or pipe, is not thinned by drawing or the like, so it has greater strength. Moreover, in addition to not creating the notching, it eliminates difficulties with stress cracking of the walls of the conduit.
3. There is immediate grabbing action of the hot-to-cold sections to eliminate relative movement between the conduit and the fitting so as to get more nearly perfect sealing fusion of the hot-to-hot walls.
4. It eliminates the streaming of the hot molten plastic that frequently created leaks in the prior art and resulted in having to cut out joints.
5. It provides a strong joint with expansion bulbs interiorly of the socket end and makes the joint more resistant to being pulled apart.
6. It eliminates the number of inferior joints because of the protracted time of holding during which there could be relative movement during the fusion of the walls.

Although this invention has been described with a certain degree of particularity, it is understood that the present disclosure is made only by way of example and that numerous changes in the details of construction and the combination and arrangement of parts may be resorted to without departing from the spirit and the scope of this invention.

What is claimed is:

1. A method of joining thermoplastic conduit comprising the steps of:
   a. forming at at least one tubular end of said conduit a tubular section of a first length $L_1$ having predetermined outside dimensions;
   b. forming at at least one socket end of a fitting having a first bore a socket section of a second length $L_2$ having a second bore of inside dimensions closely approximating said outside dimensions of said tubular end;
   c. providing in said socket end of said fitting an annular recess for receiving excess molten plastic when the hot said tubular end is inserted within said socket end;
   d. heating said tubular end for a distance $d_1$ to its softening temperature;
   e. heating said socket end for a distance $d_2$ to its softening temperature; respective distances $d_1$ and $d_2$ being selected such that when said hot softened tubular end is inserted within said hot softened socket end there will be at least a first region of hot-to-cold plastic for substantially immediate physical fixation that resists subsequent relative movement between said tubular end and said socket end, and at least one second region of hot-to-hot plastic that effects sealing union of the contiguous sections of the wall of hot softened plastic of said tubular end and said socket end; and
   f. inserting said hot, softened tubular end within said hot softened socket end such that an immediate hot-to-cold physical fixation is effected that results in substantially immediate physical fixation that resists subsequent relative movement therebetween; followed by a sealing joinder of said hot-to-hot sections, achieving a sealing interconnection between said tubular end and said socket end without the usual requirements of holding in a jig and the like for a protracted time interval.

2. The method of claim 1 wherein there is provided adjacent the interior end of said second bore a shoulder against which to abut said first tubular end; said tubular end is abutted against said shoulder of said socket end in the insertion.
3. The method of claim 2 wherein an interiorly disposed annular lip is provided adjacent said shoulder for receiving said tubular end.
4. The method of claim 1 wherein $d_1$ is less than $L_1$.
5. The method of claim 1 wherein $d_2$ is less than $L_2$.
6. The method of claim 1 wherein $d_1$ is less than $L_1$ and $d_2$ is less than $L_2$ such that two hot-to-cold sections are formed respectively adjacent the respective ends of said tubular end and said socket end; and at least one hot-to-hot section is formed between said hot-to-cold sections.
7. The method of claim 1 wherein said tubular end and said socket end are cylindrically shaped tubular conduit.
8. The method of claim 1 wherein a plurality of annular recesses are provided in said socket end.
9. The method of claim 1 wherein said predetermined outside dimensions and said inside dimensions are respectively substantially uniform.
10. A method of joining together first and second thermoplastic elements comprising the steps of:
    a. forming first and second surfaces on said first and second elements; said first and second surfaces being adapted to matingly engage when said elements are brought together in joinder;
    b. heating at least first and second portions of said first and second surfaces to their softening point; said first and second portions having respective lateral extents of distances $d_1$ and $d_2$; $d_1$ and $d_2$ being chosen and disposed such that when said first and second surfaces are disposed contiguous each other there will be at least a first region of hot-to-cold plastic for substantially immediate physical fixation that resists subsequent relative movement between said first and second surfaces and at least one second region of hot-to-hot plastic that effects sealing union of the contiguous sections of said first and second surfaces; and
    c. disposing said first and second surfaces contiguous each other to effect sealing joinder thereof that eliminates the usual requirement of holding in a jig or the like for a protracted time interval.
11. The method of claim 10 wherein said first and second surfaces are substantially planar surfaces that are abutted to each other.
12. The method of claim 11 wherein said planar surfaces comprise the annular rings on the periphery of the butt end of tubular conduit sections and said distances $d_1$ and $d_2$ are concentric annular rings on said butt end of the tubular walls of said conduit.
13. Apparatus for joining thermoplastic conduit without requiring chemical solvent or protracted immobilization in a jig and the like comprising:

a. a section of said thermoplastic conduit having at at least one tubular end a tubular section of a first length $L_1$ having predetermined outside dimensions;

b. a fitting having a first bore and having at at least one end thereof a socket end of a second length $L_2$ having a second bore having inside dimensions closely approximating said outside dimensions of said tubular end and adapted to matingly receive said tubular end; said fitting having adjacent the interior end of said second bore a shoulder against which to abut said tubular end; said fitting having an annular recess adjacent said shoulder for receiving excess molten plastic when a hot said tubular end is abutted against said shoulder for eliminating the usual streamers of plastic that interfere with proper sealing;

c. means for heating said tubular end for a distance $d_1$ to its softening temperature;

d. means forr heating said socket end for a distance $d_2$ to its softening temperature; the respective means for heating for the respective distances $d_1$ and $d_2$ being selected such that when hot softened said tubular end is inserted within hot softened said socket end, there will be at least one region of hot-to-cold plastic for substantially immediate physical fixation that resists subsequent relative movement between said tubular end and said socket end; and at least one second region of hot-to-hot plastic that effects sealing union of the contiguous sections of the wall of the hot softened plastic of said tubular end and said socket end for a sealing interconnection without the usual requirement of holding in a jig and the like for a protracted time interval.

14. The apparatus of claim 13 wherein $d_1$ is less than $L_1$.

15. The apparatus of claim 13 wherein $d_2$ is less than $L_2$.

16. The apparatus of claim 13 wherein $d_1$ is less than $L_1$ and $d_2$ is less than $L_2$ such that two hot-to-cold sections are formed respectively adjacent the respective ends of said tubular end and said socket end; and at least one hot-to-hot section is formed between said hot-to-cold sections.

17. The apparatus of claim 13 wherein said tubular end and said socket end are cylindrically shaped tubular conduit.

18. The apparatus of claim 13 wherein said fitting has an interiorly disposed annular lip adjacent said shoulder for receiving said tubular end.

19. Conduit and fitting for being joined together by only heating and joining without requiring chemical solvent or protracted immobilization in a jig and the like comprising:

a. a section of thermoplasticc conduit having at at least one tubular end a tubular section of a first length $L_1$ having substantially uniform outside dimensions;

b. a thermoplastic fitting having a first bore and having at at least one end a socket end of a second length $L_2$ having a second bore having substantially uniform inside dimensions closely approximating said outside dimensions of said tubular end; said fitting having adjacent the interior end of said second bore a shoulder against which to abut said first tubular end; said fitting having an annular recess adjacent said shoulder for receiving excess molten plastic when a hot said tube end is abutted against said shoulder for eliminating the usual streamers of plastic that interfere with proper sealing unless held exactly aligned;

such that said tubular end and said socket end can be heated for respective distances $d_1$ and $d_2$; said distances $d_1$ and $d_2$ being selected such that when said hot softened tubular end is inserted within said hot softened socket end there will be at least one region of hot-to-hot plastic for substantially immediate physical fixation to resist subsequent relative movement between said tubular end and said socket end and there will be formed at least one second region of hot-to-hot plastic that effects sealing union of the contiguous sections of the walls of said hot softened plastic of said tubular end and said socket end, thereby achieving a sealing interconnection without the usual requirement of holding in a jig and the like for a protracted time interval.

20. The conduit and fitting of claim 19 wherein $d_1$ is less than $L_1$ and $d_2$ is less that $L_2$ such that two hot-to-cold sections are formed respectively adjacent the respective ends of said tubular end and said socket end; and at least one hot-to-hot section is formed between said hot-to-cold section.

21. The conduit and fitting of claim 19 wherein said section of conduit has said tubular end at both its ends and said fitting has a plurality of said socket ends for forming a continuum of thermoplastic conduit for a desired network.

22. The conduit and fitting of claim 19 wherein said fitting has two socket ends and is a coupling for forming a linear interval of said conduit.

23. The conduit and fitting of claim 19 wherein said fitting has three socket ends and is a tee for forming a branching network of said thermoplastic conduit.

24. The conduit and fitting of claim 19 wherein said fitting has four socket ends and is a cross for forming a more complex network of said conduit.

25. The conduit and fitting of claim 19 wherein said fitting had adjacent each said shoulder an interiorly disposed annular lip for receiving said tubular end.

* * * * *